United States Patent
Clark et al.

(10) Patent No.: US 7,111,063 B1
(45) Date of Patent: Sep. 19, 2006

(54) DISTRIBUTED COMPUTER NETWORK HAVING A ROTATING MESSAGE DELIVERY SYSTEM SUITABLE FOR USE IN LOAD BALANCING AND/OR MESSAGING FAILOVER

(75) Inventors: Douglas W. Clark, Southlake, TX (US); Richard Hathaway, Denton, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 747 days.

(21) Appl. No.: 10/083,418

(22) Filed: Feb. 26, 2002

(51) Int. Cl.
*G06F 15/16* (2006.01)
(52) U.S. Cl. ...................... 709/225; 718/105
(58) Field of Classification Search ................ 709/206, 709/207, 225; 718/105
See application file for complete search history.

(56) References Cited

U.S. PATENT DOCUMENTS

| | | | | |
|---|---|---|---|---|
| 5,519,834 A | * | 5/1996 | Kamerman et al. ......... | 709/225 |
| 5,835,724 A | * | 11/1998 | Smith ........................ | 709/227 |
| 5,872,926 A | * | 2/1999 | Levac et al. ................ | 709/206 |
| 6,021,262 A | * | 2/2000 | Cote et al. .................. | 714/48 |
| 6,032,184 A | * | 2/2000 | Cogger et al. .............. | 709/223 |
| 6,128,646 A | * | 10/2000 | Miloslavsky ................ | 709/206 |
| 2002/0194333 A1 | * | 12/2002 | Baek et al. ................. | 709/225 |
| 2003/0149755 A1 | * | 8/2003 | Sadot ......................... | 709/223 |

* cited by examiner

*Primary Examiner*—Beatriz Prieto
*Assistant Examiner*—Benjamin A. Ailes

(57) ABSTRACT

A distributed computing environment includes a client platform, plurality server platforms, plural applications distributed amongst the plural server platforms, a messaging system, a plurality of data files and a load balancing and failover software application. Maintained in the data file for each application is a list of each instance of the application, where it resides and a pre-determined time span assigned thereto. The time spans maintained in the data file are arranged in a self-repeating sequence, collectively comprise a first unit of time and respectively encompass a contiguous range of values for a second unit of time. For each message to be delivered to a distributed application, the load balancing and failover software application selects the server platform to receive the message. The load balancing and failover software application then determines if the selected server platform has failed and, if so, selects a substitute server platform.

25 Claims, 4 Drawing Sheets

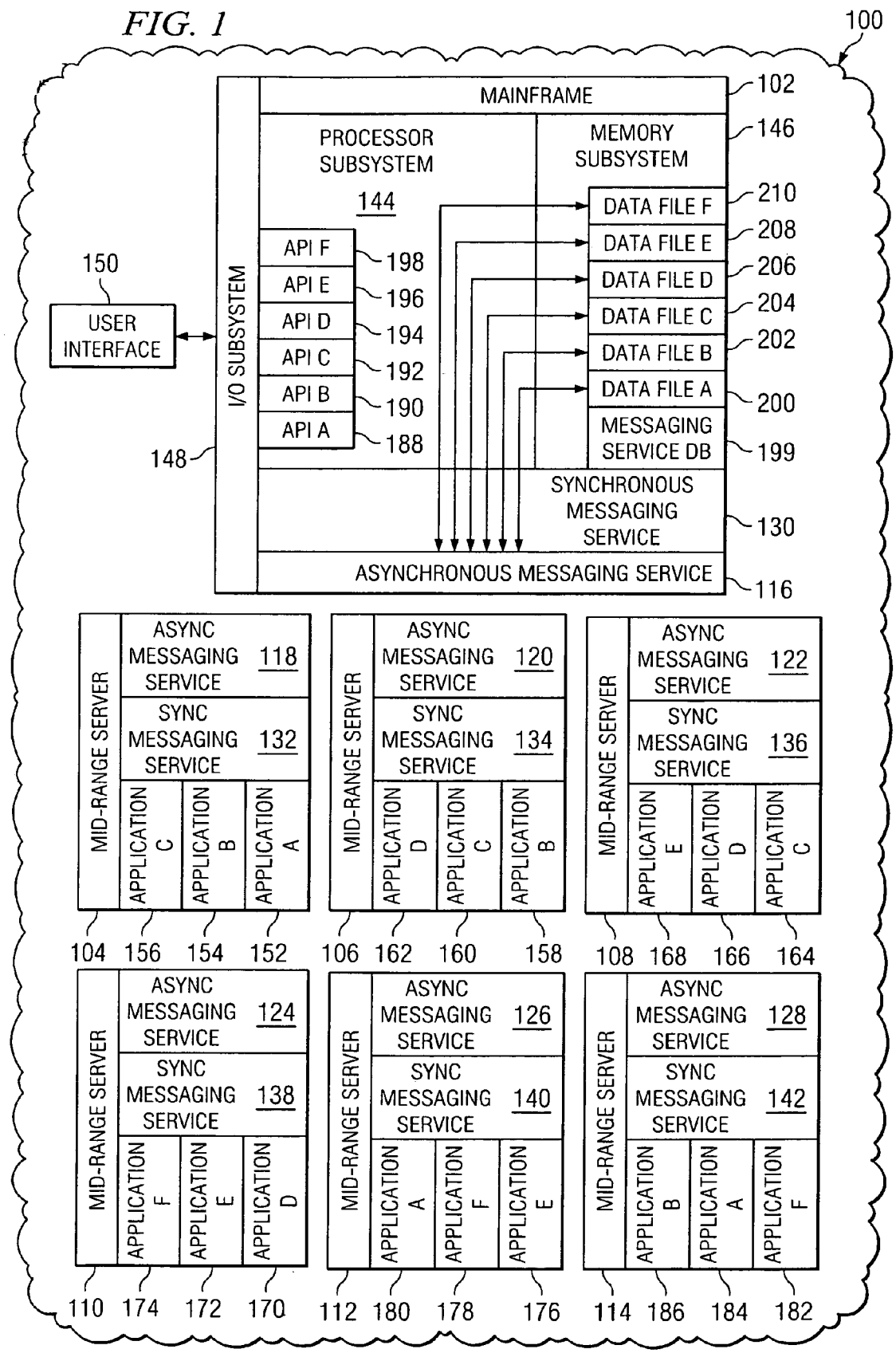

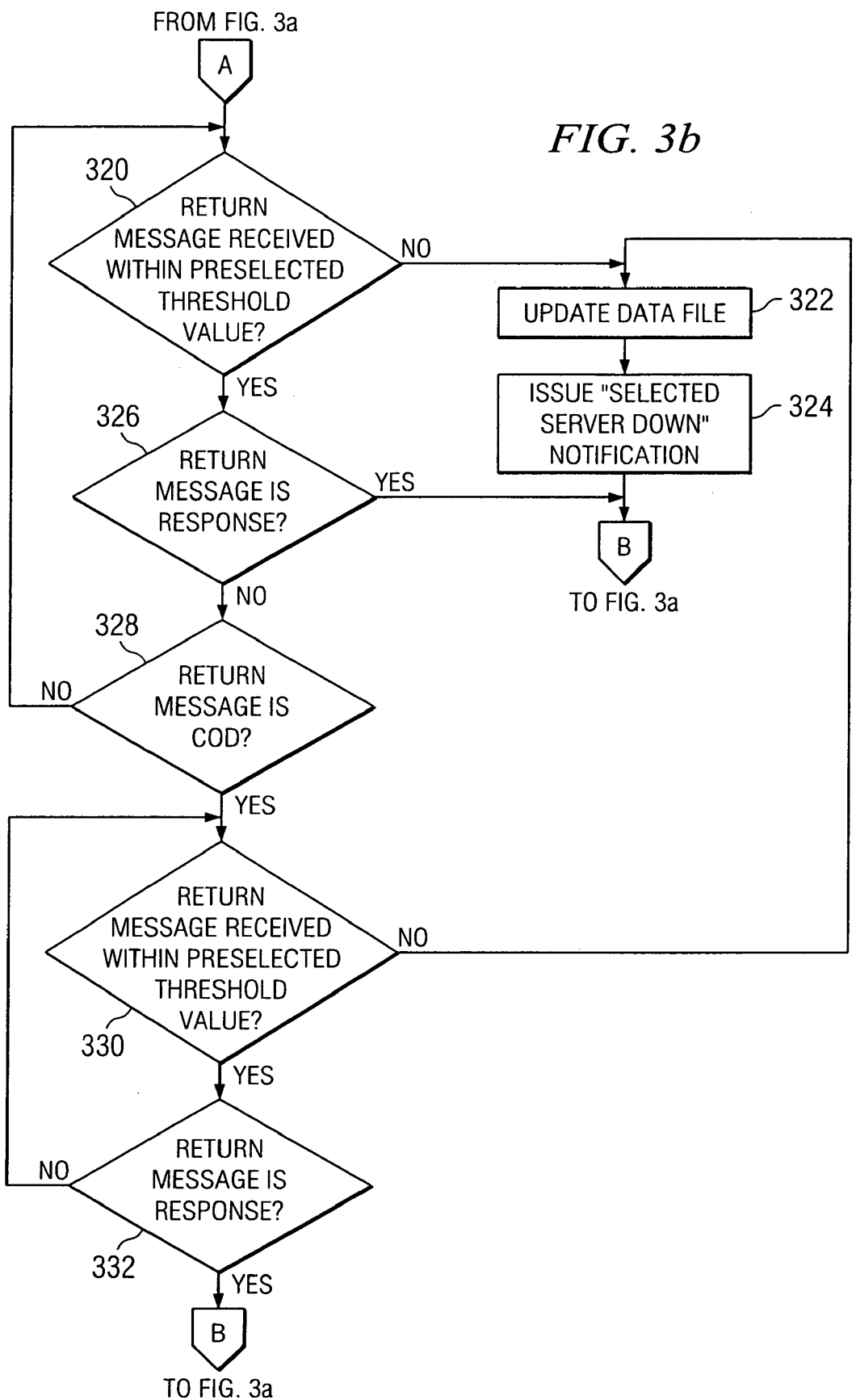

DISTRIBUTED COMPUTER NETWORK HAVING A ROTATING MESSAGE DELIVERY SYSTEM SUITABLE FOR USE IN LOAD BALANCING AND/OR MESSAGING FAILOVER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is directed to a distributed computer network having a rotating message delivery system suitable for use in load balancing and/or messaging failover among plural computer platforms thereof. By rotating messaging services among the plural computer platforms in a manner that takes both load balancing and messaging failover into account, operation of the distributed computer network can be enhanced.

BACKGROUND OF THE INVENTION

In a computer network, plural computer systems are joined together to exchange information and share resources. Thus, a computer network is a distributed computing environment in which networked computer systems provide user with the capabilities of access to distributed resources, for example, remote files and databases or remote printers, and to distributed processing, for example, where an application is processed on two or more computer systems. In such a distributed computing environment, the components of an application may reside on different machines but work together. For example, each work station in a computer network often provides a user interface and local analysis and data processing, while larger, host computers, for example, a file server or mainframe, may maintain a large set of data files, coordinate access to large databases and perform larger scale data processing. In another distributed computing environment, an instance of an application is distributed to plural computers within the network. Such a network can more reliably perform a requested task by having a second instance of an application available to perform the task in the event that a first instance of the application is unavailable. Processes by which tasks are reassigned amongst plural instances of an application based upon availability of the instances shall hereafter be termed as "failover" processes. Similarly, by distributing requested tasks among plural instances of an application, any particular instance of the application will be less vulnerable to overloads. Processes by which tasks are distributed amongst plural instances of an application shall hereafter be termed as "load balancing" processes.

In distributed processing environments such as these, each application or process must be able to communicate and exchange information with other applications or processes in the environment. Currently, many inter-application or inter-process exchanges are performed using a messaging technique commonly referred to as message queuing. In message queuing, a first (or "client") process passes a message to request processing by a second (or "server") process. The messages are queued at the server process by a queue manager to await handling by the server process. In turn, the server process returns an alert when the results are ready. One message oriented middleware product which uses a message queuing messaging technique to enable processes to communicate and exchange information in a distributed computing environment is known as MQ Series messaging software and is commercially available through International Business Machines Corporation of Armonk, N.Y.

The MQ series provides certain functionality which may be used in support of failover and/or load balancing processes. More specifically, the MQ series supports these processes by the use of clustered queues. In an MQ series cluster, both a queue manager and an instance of the server process reside on each one of plural computer platforms. To enable clustering, however, the MQ series relies upon one or more repository queue managers that contain information about all queue managers and their components. Repository queue managers periodically send updates to each other to stay in synchronization. Typically, two or more, but not all, queue managers in a cluster are repository queue managers. The other queue managers in the cluster receive the information they need from the repository queue managers. Each of the queue managers in the cluster define a common transmission queue and common receiver channel. As a result, a message may be handled by any one of the queue managers.

When a cluster contains more than one instance of the same queue, MQ Series uses a workload management algorithm to determine the best queue manager to route a message to. The workload management algorithm selects the local queue manager as the destination wherever possible. If there is no instance of the queue on the local queue manager, the algorithm determines which destinations are suitable. Suitability is based on the state of the channel, including any priority assigned to the channel, and also the availability of the queue manager and queue. The algorithm then uses a round-robin approach to finalize its choice between the suitable queue managers.

It should be readily appreciated that, in its current implementation, MQ Series clustering has a number of limitations when used to support failover and/or load balancing in a distributed processing environment. For example, requiring plural repository queue managers which periodically update one another for implementing clustering would likely add considerable overhead to the delivery of messages within the distributed processing environment. Similarly, round-robin approaches are overhead intensive. Additionally, the workload management algorithm used in MQ Series clustering focuses on the queue itself and does not give sufficient weight to other considerations. For example, while MQ Series clustering will determine if a queue manager is unavailable, it while not determine if the instance of the application taking the message off the queue is working.

Accordingly, this invention seeks to provide load balancing and/or failover capabilities within distributed processing environments which use MQ Series or other messaging services for exchanges between platforms while avoiding the various shortcomings of current MQ Series functionality which supports load balancing and/or failover. In particular, the invention discloses load balancing and failover processes suitable for use in distributed processing environments without significant effect on overhead.

SUMMARY OF THE INVENTION

In one embodiment, the present invention is directed to a distributed processing environment which includes a client computer platform and plural server computer platforms, each having an instance of an application residing thereon. A messaging system which controls the exchange of messages between the client computer platform and the server computer platforms including messaging services residing at the client computer platform and each one of the plurality of server computer platforms. A time-distributed load balancing system residing at the client computer platform determines, for a message to be transferred to the application by the messaging system, which one of the plurality of server computer platforms is to receive the message. The load balancing system makes this determination based upon a time associated with the message and at least one message distribution rule requiring transfer of the message to a selected one of the plurality of server computer platforms if the time associated with the message, for example, an arrival time for the message at the messaging service residing at the client computer platform, falls within a corresponding one of a plurality of pre-determined time spans. The time associated with the message may include values for first and second units of time. If so, each one of the pre-determined time spans shall encompass a contiguous range of values for the second unit of time.

In one aspect thereof, the time-distributed load balancing system uses the at least one message distribution rule to divide the first unit of time into the plurality of pre-determined time spans. The plurality of pre-determined time spans to may then be associated to the corresponding one of the plurality of server computer platforms. In this aspect, the time-distributed load balancing system determines which of the plurality of server computer platforms shall receive the message based upon which, of the plurality of pre-determined time spans, the value of the second unit of time associated with the message falls within.

In a further aspect of this embodiment of the invention, the time-distributed load balancing system residing at the client computer platform includes a data file for maintaining a list of the plurality of server computer platforms, the pre-determined time span associated with each one of the plurality of server computer platforms and the contiguous range of values for the second unit of time encompassed by the pre-determined time span associated with each one of the plurality of server computer platforms. In this aspect, a software application implements the at least one message distribution rule by determining which one of the plurality of server computer platforms shall receive the message. To do so, the software application, compares the value of the second unit of time associated with the message to the contiguous range of values encompassed by each one of the plurality of pre-determined time spans maintained in the data file.

In still further aspects of the invention, the software application reside within the messaging service residing at the client computer platform, the client computer platform may be a mainframe computer system, the server computer platforms may be mid-range server computer system and the messaging services residing at the client computer platform and each one of the server computer platforms may be asynchronous messaging services which enable the exchange of messages between mainframe and mid-range server computer systems.

In another embodiment, the present invention is directed to a distributed processing environment which includes a client computer platform and a plurality of server computer platforms, each having an instance of an application residing thereon. A messaging system which includes messaging services residing at the client computer platform and each one of the plurality of server computer platforms control the exchange of messages between the client computer platform and the plurality of server computer platforms. A time-distributed load balancing and failover system residing at the client computer platform determines, for a message to be transferred to the application by the messaging system, which one of the plurality of server computer platforms is to receive the message. The time-distributed load balancing and failover system makes this determination based upon a time associated with the message, at least one message distribution rule requiring transfer of the message to a selected one of the plurality of server computer platforms if the time associated with the message falls within a corresponding one of a plurality of pre-determined time spans and at least one failover rule requiring transfer of the message to a subsequent one of the plurality of server computer platforms associated with a subsequent one of the plurality of pre-determined time spans if the selected server computer platform has failed.

In one aspect thereof, the time associated with the message includes values for first and second unit of time. In this aspect, each one of the plurality of pre-determined time spans encompasses a contiguous range of values for the second unit of time. In another aspect thereof, the time-distributed load balancing and failover system uses the at least one message distribution rule to divide the first unit of time into the plurality of pre-determined time spans. The time-distributed load balancing and failover system then associates each one of the plurality of pre-determined time spans with a corresponding one of the server computer platforms and arranges the plurality of pre-determined time spans into a self-repeating sequence. In further accordance with this aspect of the invention, the time distributed load balancing and failover system then determines which of the plurality of server computer platforms is to receive the message based upon which one, of the plurality of pre-determined time spans, the value of the second unit of time associated with the message falls within. The time-distributed load balancing and failover system then uses the at least one failover rule to select a subsequent server computer platform to receive the message if the server computer platform associated with the pre-determined time span within which the value of the second unit of time associated with the message falls within has failed. More specifically, the time-distributed load balancing and failover system selects, as the subsequent server computer platform to receive the message, the server computer platform associated with a next pre-determined time span in the self-repeating sequence of the pre-determined time spans.

In a further aspect thereof, the time-distributed load balancing and failover system residing at the client computer platform further includes a data file and a software application. The data file maintains a list of the plurality of server computer platforms, the predetermined time span associated with each one of the plurality of server computer platforms, the contiguous range of values for the second unit of time encompassed by the pre-determined time span associated with each one of the plurality of server computer platforms and a mark indicating which ones of the plurality of server computer platforms have failed. In this aspect, the software application implements the at least one message distribution rule to determine which of the plurality of server computer platforms shall receive the message by comparing the value of the second unit of the time associated with the message to the contiguous range of values encompassed by each one of the plurality of pre-determined time spans maintained in the data file. In a still further aspect, the software application also implements the at least one failover rule to determine that, if the server computer platform associated with the pre-determined time span within which the value of the second unit of time associated with the message falls within has failed, the server computer platform associated with the next pre-determined time span in the self-repeating sequence of the pre-determined time spans shall receive the message.

In still another embodiment, the present invention is directed to a distributed processing environment which includes a client computer platform and a plurality of server computer platforms coupled to the client computer platform. Messages between the client and server computer platforms are controlled by an asynchronous messaging system which includes asynchronous messaging services residing at the client computer platform and each one of the server computer platforms. The distributed processing environment further includes at least two instances of each one of a plurality of applications distributed among the plurality of server computer platforms such that the various instances of each application reside at respective ones of the plurality of server computer platforms. A plurality of data files, each corresponding to one of the plurality of applications resides at the client computer platform. Maintained in each of the data files is a list of each instance of the application, the server computer platform on which it resides and a pre-determined time span assigned to the instance. The pre-determined time spans maintained in a data file are arranged in a self-repeating sequence, collectively comprise a first unit of time and respectively encompass a contiguous range of values for a second unit of time. Also residing at the client computer system is a load balancing and failover software application. For each message to be delivered to an application distributed among the server computer platforms, the load balancing and failover software application shall first determine an arrival time of the message at the asynchronous messaging service of the client computer platform and then select, as the server computer platform to receive the message, the server computer platform corresponding to the pre-determined span of time assigned to the instance of the application for which the second value for the arrival time falls within the contiguous range of values.

In one aspect of this embodiment of the invention, each data file further maintains an indication as to whether the listed instances of the application have failed. In further accordance with this aspect, the load balancing and failover software application determines, for each message to be delivered to the distributed application, if the selected server computer platform has failed. If the selected server computer platform has failed, the load balancing and failover software application proceeds to select, as a substitute server computer platform, the server computer platform associated with a next pre-determined time span in the self-repeating sequence of the pre-determined time spans. The load balancing and failover software application will then repeat the determination and selection actions until the selected computer platform is determined to not have failed or until all server computer platforms have been selected and subsequently determined to have failed.

In another aspect of this embodiment, the load balancing and failover software application is further configured to remove the failure indication from each instance of an application residing on a server computer platform each time that the server computer platform re-registration with the asynchronous messaging system residing at the client computer platform. In still another, a synchronous messaging service resides on each one of the plurality of server computer platforms. In accordance with this aspect, the synchronous messaging service handles the exchange of messages between the asynchronous messaging service and the application instances residing on the server computer platform. In further accordance with this aspect, the asynchronous messaging service reports two types of responses from the server computer platform selected to receive the message. The first type of message confirms receipt of the message by the messaging service at the selected server while the second type of message confirms receipt of a response to the message. Upon failing to receive the first type of message within a pre-selected time period, the load balancing and failover software application shall determine that all instances of applications residing at the selected server computer system have failed. Conversely, upon failing to receive the second type of message within the pre-selected time period, the load balancing and failover software application determines that the selected instance of the application residing at the selected server computer system has failed. Alternately, the load balancing and failover software application may, upon failing to receive the first type of message within a pre-selected time period, determine that all the instances of the plurality of applications residing at the selected server computer system have failed and may, upon failing to receive the second type of message within the pre-selected time period, determine that all the instances of the plurality of applications residing at the selected server computer system have failed.

DESCRIPTION OF DRAWINGS

FIG. 1 is a block diagram of a distributed processing configured to include load balancing and failover capabilities and constructed in accordance with the teachings of the present invention.

FIGS. 3a–b is a flow chart of a method by which load balancing and failover processes are executed within the distributed processing environment of FIG. 1.

DETAILED DESCRIPTION OF THE INVENTION

Figure 2A:
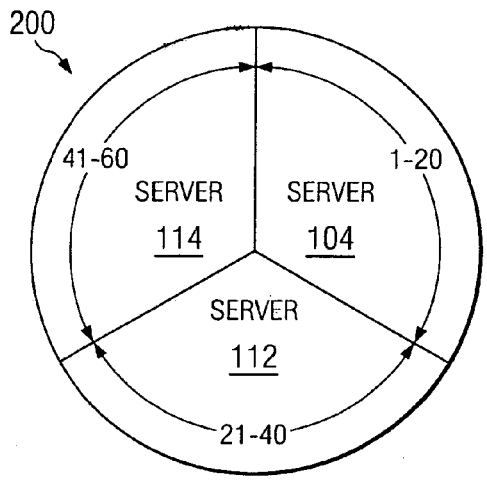
FIG. 2a is a graphical representation of a first data file of the distributed processing environment of FIG. 1.

Referring now to FIG. 1, a distributed processing environment 100, for example, a computer network, may now be seen. The distributed processing environment 100 is comprised of a first computer platform 102 and plural additional computer platforms 104, 106, 108, 110, 112 and 114, all of which are coupled together by conventionally configured communication links (not shown) into a selected topology, for example, a star, ring or other desired topology. By way of example, the first computer platform 102 is a mainframe system and the plural additional computer platforms 104 through 114 are mid-range server systems. It should be clearly understood, however, that other computer platforms would be suitable for the uses contemplated herein. Finally, while not illustrated in FIG. 1, it is fully contemplated that plural personal computers ("PCs") may be coupled to each mid-range server system 104 through 114. Within the distributed computing environment 100, the mainframe system 102 is hereby designated as a local platform while the mid-range server systems 104 through 114 are all designated as remote platforms. Of course, the designation of any particular computer platform as the "local" platform is purely arbitrary and it should be clearly understood that those computer platforms designated as "remote" platforms should be viewed simply being remote relative to the local platform.

As will be more fully described below, the distributed processing environment 100 uses an asynchronous queue-based messaging system for the exchange of messages between the mainframe 102 and selected ones of the mid-range server systems 104 through 114 and a synchronous messaging system for the exchange of messages between various ones of the mid-range server systems 104 through 114. Accordingly, a first asynchronous messaging service 116 resides on the mainframe 102 and additional asynchronous messaging services 118, 120, 122, 124, 126 and 128 reside on the mid-range servers 104, 106, 108, 110, 112 and 114, respectively. Similarly, a first synchronous messaging service 130 resides on the mainframe 102 and additional synchronous messaging services 132, 134, 136, 138, 140 and 142 reside on the mid-range servers 104, 106, 108, 110, 112 and 114, respectively.

In accordance with the embodiment of the invention disclosed herein, the distributed processing environment 100 is comprised of disparate computer platforms, the asynchronous queue-based messaging system used to exchange messages between the mainframe 102 and the mid-range server systems 104 through 114 is the aforementioned MQ Series messaging software well known for its support of a wide variety of disparate computer platforms and operating systems and the synchronous messaging system used to exchange messages between various ones of the mid-range server systems 104 through 114 may be any one of the various available synchronous messaging systems. While, in the embodiment disclosed herein, the distributed processing environment is configured such that plural messaging services, specifically, both asynchronous and synchronous messaging services reside at each computer system thereof, it should be clearly understood that the invention is equally suitable in distributed processing environments configured such that only a single messaging service resides at one or more of the computer systems thereof. For example, if the distributed computing environment consisted only of mid-range servers such as the mid-range servers 104 through 114 arranged in a ring topology, only the synchronous messaging service would need to reside at each of the mid-range servers. Further by way of example, if the disclosed distributed processing environment was arranged in a star topology such that the mid-range servers 104 through 114 only exchanged messages with the mainframe 102 and did not exchange messages with one another, the mid-range servers 104 through 114 would have no need for the synchronous messaging service. As a result, in such a distributed processing environment, only the asynchronous messaging service would be needed.

As illustrated in FIG. 1, the mainframe 102 includes a processing subsystem 144, a memory subsystem 146, and an input/output ("I/O") subsystem 148 coupled together by a bus subsystem (not shown). As used herein, the terms "couple" or "coupled" refer broadly to either direct or indirect connection therebetween. The bus subsystem encompasses the main system bus and any local or other types of busses that collectively couple the processor subsystem 144, the memory subsystem 146 and the I/O subsystem 148 of the mainframe 102. The processor subsystem 144 encompasses the collective processing capability of the mainframe 102, including the central processing unit ("CPU") as well as any secondary processing devices, coupled to the CPU by the bus subsystem. Similarly, the memory subsystem 146 encompasses the collective storage capability of the mainframe 102, including main, auxiliary, cache and any other memory accessible by the processor subsystem 144 via the bus subsystem. Finally, the I/O subsystem 148 encompasses any and all I/O devices, for example, floppy, CD-ROM or DVD drives, coupled to the bus subsystem, for writing data to or reading data from the processor subsystem 144 or the memory subsystem 146. The I/O subsystem 148 also encompasses any data communications equipment ("DCE"), for example, network interface cards or modems, which couple the mainframe 102 to data terminal equipment ("DTE") within the distributed computing environment 100, for example, the mid range servers 104, 106, 108, 110, 112 and 114. The I/O subsystem 148 also couples user interface 150 to the mainframe 102. The user interface 150 encompasses all devices used by a user, for example, a network administrator, to interact with the mainframe 102 while either obtaining information therefrom or providing data or instructions thereto. While a typical user interface encompasses a monitor, keyboard, mouse and printer, it should be clearly understood that there are a wide variety of other devices which may also form part of the user interface 150.

As may be further seen in FIG. 1, plural software applications reside on each one of the mid-range servers 104 through 114. Each one of the software applications is comprised of a series of instructions encoded in the memory of the mid-range server on which it resides as computer readable program code which is executable by the processor thereof. More specifically, first, second and third software applications 152, 154 and 156 reside on the mid-range server 104, first, second and third software applications 158, 160 and 162 reside on the mid-range server 106 first, second and third software applications 164, 166 and 168 reside on the mid-range server 108 first, second and third software applications 170, 172 and 174 reside on the mid-range server 110 first, second and third software applications 176, 178 and 180 reside on the mid-range server 112 and first, second and third software applications 182, 184 and 186 reside on the mid-range server 114.

Each one of the software applications 152 through 186 is an instance of an application which resides on plural ones of the mid-range servers 104 through 114. More specifically, the software application 152 residing on the mid-range server 104, the software application 180 residing on the mid-range server 112 and the software application 184 residing on the mid-range server 114 are first, second and third instances of application A. Similarly, the software application 154 residing on the mid-range server 104, the software application 158 residing on the mid-range server 106 and the software application 186 residing on the mid-range server 114 are first, second and third instances of application B; the software application 156 residing on the mid-range server 104, the software application 160 residing on the mid-range server 106 and the software application 164 residing on the mid-range server 108 are first, second and third instances of application C; the software application 162 residing on the mid-range server 106, the software application 166 residing on the mid-range server 108 and the software application 170 residing on the mid-range server 110 are first, second and third instances of application D; and the software application 168 residing on the mid-range server 108, the software application 172 residing on the mid-range server 110 and the software application 176 residing on the mid-range server 112 are first, second and third instances of application E. Finally, the software application 174 residing on the mid-range server 110, the software application 178 residing on the mid-range server 112 and the software application 182 residing on the mid-range server 114 are first, second and third instances of application F.

In the foregoing distribution of applications A through F among mid-range servers 104 through 114, three instances of each one of the applications A through F were distributed among the mid-range servers 104 through 114 and three applications were installed on each of the mid-range servers 104 through 114. It should be clearly understood that this is one example of a distribution of applications among plural computer systems and that innumerable other application distributions may instead be implemented. For example, if various ones of the applications A through F differed dramatically in size, the number of applications installed at a particular computer system may vary depending on the particular applications selected for installation thereat. A similar uneven distribution of applications may result if the processors for various ones of the computer systems varied dramatically in size. Another consideration when configuring the distribution of applications among plural processors would be the frequency at which the various applications are called. For example, if applications A and B are called much more frequently than the remaining applications, it may be advantageous to configure the instances of the Applications A through F such that no more than one instance of either application A or B resides on any one computer system.

Residing on the processor subsystem 144 of the mainframe 102 are first, second, third, fourth, fifth and sixth application program interfaces ("APIs") 188, 190, 192, 194, 196 and 198. Each one of the APIs 188 through 198 is comprised of a series of instructions encoded in the memory subsystem 146 as computer readable program code which is executable by the processor subsystem 144. Each one of the APIs 188 through 198 is the API for a corresponding one of the applications A through F. More specifically, the first API 188 is the API for the application A; the second API 190 is the API for the application B; the third API 192 is the API for the application C; the fourth API 194 is the API for the application D; the fifth API 196 is the API for the application E; and the sixth API 198 is the API for the application F. Each one of the APIs 188 through 198 includes a set of software calls and routines for communicating with the various instances of the corresponding applications A through F so that the APIs A through F may utilize the services of any one or more of the plural instances of the corresponding applications A through F when responding to a request. Thus, the API 188 may utilize the services of the applications 152, 180 and 184; the API 190 may utilize the services of the applications 154, 158 and 186; the API 192 may utilize the services of the applications 156, 160 and 164; the API 194 may utilize the services of the applications 162, 166 and 170; the API 196 may utilize the services of the applications 168, 172 and 176; and the API 198 may utilize the services of the applications 174, 178 and 182.

For each of the applications A through F, information held in a corresponding data file maintained in the memory subsystem 146 is used to select among the plural instances of the application. As will be more fully described below, whenever the asynchronous messaging service 116 residing at the mainframe 102 is to transfer a request message to an application, for example, the application A for which instances reside on the mid-range servers 104, 112 and 114, the asynchronous messaging service 116 will review the information maintained in the corresponding data file 200 and, using that information, select an instance of the application A for subsequent transmission of the request message thereto. Thus, by appropriate usage of the information contained the data files 200 through 210, the asynchronous messaging service 116 is able to balance the load amongst plural instances of the various applications residing at the mid-range servers 104 through 114 by distributing requests issued thereby amongst the plural instances of the applications. The asynchronous messaging service 116 will also periodically update the data files 200 through 210 with information regarding the availability of the various servers on which the instances of the application resides. By periodically updating the data files 200 through 210 with availability information, during subsequent accesses of the updated flat file, the asynchronous messaging service 116 may limit its selection to available servers, thereby providing a failover mechanism which prevents the transmission of request messages to failed servers and/or failed application instances residing thereon.

In the embodiment of the invention disclosed herein, for each application A through F having plural instances thereof distributed among the mid-range servers 104 through 114, a corresponding API and data file reside in the processor and memory subsystems 144 and 146, respectively, of the mainframe 102. It should be clearly understood, however, that the disclosed configuration of a distributed processing environment is but one embodiment of the invention and that the invention is equally suitable with a wide variety of other configurations. For example, instead of the disclosed APIs A through F, local instances of one or more of the applications A through F may instead reside on the mainframe 102. Alternately, the applications residing on the mainframe 102 may be entirely distinct from the applications distributed among the mid-range servers 104 through 114. In such a configuration, an application residing on the mainframe 102 would periodically issue a call to an application residing on one of the mid-range servers 104 through 114 to perform a service, for example, execute a calculation, on its behalf. As further disclosed herein, a one-to-one correspondence exists between the APIs A through F residing on the mainframe 102 and the applications A through F distributed over the mid-range servers 104 through 114. It should be clearly understood, however, that such a one-to-one correspondence need not exist. For example, in one embodiment of the invention, an API residing on the mainframe 102 may require the services of plural applications distributed amongst the mid-range servers 104 through 114.

It is further noted that, in the embodiment of the invention disclosed herein, the disclosed load balancing and failover functionality is integrated into the asynchronous messaging service 116. However, it is specifically contemplated that the disclosed load balancing and failover functionality may reside elsewhere within the distributed processing environment 100 while remaining within the scope of the present invention. For example, one or more discrete software applications residing on the mainframe 102 (or elsewhere within the distributed processing environment 100) may be used to provide the asynchronous messaging service 116 with load balancing and failover information upon request. In such a configuration, upon receiving an instruction to transfer a request message to an application having plural instances thereof distributed amongst plural ones of the mid-range servers 104 through 114, the asynchronous messaging service 116 would request a load balancing/failover application to indicate which one of the plural instances of the application should the asynchronous messaging service 116 transfer the request message. In such an embodiment, the asynchronous messaging service 116 would also periodically update the load balancing/failover application as to any failure and/or re-registration of the mid-range servers 104 through 114. Variously, a discrete load balancing/failover application may be provided for each distributed application or, in the alternative, the balancing/failover information for all of the distributed applications may be maintained in one application.

Rather than residing within the asynchronous messaging service 116, in still other alternate configurations thereof, the disclosed load balancing/failover functionality may be integrated into or accessible by the APIs 188 through 198 themselves. In such configurations, the APIs 188 through 198 would first determine which of the plural instances of the associated application should receive the request message. When subsequently transferring the request message to the asynchronous messaging service 116, the APIs 188 through 198 would instruct the asynchronous messaging service 116 as to the destination of the request message. The load balancing/failover functionality may be integrated into the APIs 188 through 198 themselves or reside in discrete applications to be accessed by the APIs 188 through 198.

Continuing to refer to FIG. 1, working in conjunction with the synchronous messaging services 130 and 132 through 142, the asynchronous messaging services 116 and 118 through 128 enable request messages received from an API or application residing on the mainframe system 102 to be directed to an instance of a distributed application residing on one of the mid-range servers 104 through 114. Again, in conjunction with the synchronous messaging services 130 and 132 through 142, the asynchronous messaging services 116 and 118 through 128 further enable reply messages from the instances of the distributed applications residing on the mid-range servers 104 through 114 to be returned to the API or application residing on the mainframe system 102. As will be more fully described below, the asynchronous messaging service 116 manages a portion of the memory subsystem 146, hereafter referred to as a messaging service database 199. Within the messaging service database 199, the asynchronous messaging service 116 maintains plural message queues as well as control information which defines, among other items, the attributes of each queue maintained thereby. Commercially available software suitable for use as the asynchronous messaging service 116, as well as the asynchronous messaging services 118 through 128 is the aforementioned IBM MQ Series messaging software.

A queue-based messaging system such as the MQ Series messaging software is comprised of a messaging application, for example, the asynchronous messaging service 116, which handles messages for a server process, for example, the API 188, and a messaging application, for example, the asynchronous messaging services 118 through 128, which handles messages for a client process, for example, the application instances 152 through 186. For a queue-based messaging system such as this, a queue manager would reside on the asynchronous messaging service 116 and on the asynchronous messaging service 118. The queue managers are system programs that provide queuing services to APIs and applications such as the APIs 188 through 198 and the application instances 152 through 186. The queue managers further provide interfaces so that the respective APIs and/or applications processes serviced thereby can put messages onto, and get messages from, queues. Finally, the queue managers provide additional functions so that administrators can create new queues, alter the properties of existing queues, and control the operation of the queue manager itself. It should be noted that plural queue managers may run on a single messaging application such as the asynchronous messaging services 116 and 118 through 128. For example, for the aforementioned MQ Series messaging software, plural queue managers may run on MVS, OS/2, Windows NT, Digital OpenVMS and UNIX systems.

Residing within the messaging service database 199 are plural queues (not shown) managed by the queue manager (also not shown) of the asynchronous messaging service 116. These queues include a transmission queue, an alias queue, one or more local queues and one or more remote queues. The asynchronous messaging services 118 through 128 residing on the mid-range servers 104 through 114 are similarly configured with a queue manager, a transmission queue, an alias queue, one or more local queues and one or more remote queues, none of which are shown in FIG. 1 for ease of illustration. The process by which a request message is delivered from a client process, for example, the API 188, to a server process, for example the application instance 152 residing on the mid-range server 104 will now be described in greater detail.

Via the synchronous messaging service 130, the API 188 will first connect to the queue manager of the asynchronous messaging service 116 to request that the queue manager open a remote queue which contains a description of the destination of the request message. After selecting the application instance 152 residing on the mid-range server 104 from amongst the application instances 152, 180 and 184 residing on the mid-range servers 104, 112 and 114, respectively, as the destination of the request message in accordance with the techniques set forth in greater detail with respect to FIGS. 3a–b, below, the queue manager opens the corresponding remote queue so that the request message may be placed in the opened remote queue. The queue manager then places the request message onto the transmission queue where it will be transmitted over an available channel to the transmission queue controlled by the asynchronous messaging service 118. Upon arriving at the transmission queue for the asynchronous messaging service 118, the queue manager for the asynchronous messaging service 118 will assume control of the request message. From the transmission queue, the queue manager for the asynchronous messaging service 118 will first direct the request message to an alias queue (if plural initiation queues are accessed through a single alias queue) and on to a trigger-initiated local queue. If there are no messages sitting in the trigger-initiated local queue upon arrival of the request message, the queue manager will notify the application instance 152, via the synchronous messaging service 132, of the arrival of the request message. On behalf of the application instance 152, the synchronous messaging service 132 will then connect to the queue manager of the asynchronous messaging service 118 to request that the queue manager open the trigger-initiated local queue on which the request message resides and, after the trigger-initiated local queue has been opened as requested, the synchronous messaging service 132 retrieves the request message from the trigger-initiated local queue.

When configuring request messages for delivery to the asynchronous messaging services 118 through 128, the asynchronous messaging service 116 utilizes the confirmation-on-delivery ("COD") functionality available as part of the MQ series messaging service. As a result, when the request message delivered to the asynchronous messaging service 118 has been removed from the trigger-initiated local queue by the synchronous messaging service 132, the queue manager for the asynchronous messaging service 118 generates a COD message for transmission back to the asynchronous messaging service 116. Normally, the arrival of a COD message at the server messaging application, here, the asynchronous messaging service 116, would indicate the successful arrival of the request message at the client process, here, the application instance 152. In the embodiment of the invention disclosed herein, however, the asynchronous messaging service 118 is wrapped by the synchronous messaging service 132. As a result, as disclosed herein, the arrival of a COD message at the asynchronous messaging service 116 merely indicates that the request message has been successfully taken off of the local queue by the synchronous messaging service 132. Upon receipt of the message, the instance 152 processes the request message and generates a response message to be returned to the API 188. More specifically, the response message generated by the instance 152 is delivered to the asynchronous messaging service 118 via the synchronous messaging service 132. In turn, the asynchronous messaging service 118 transfers the response message to the asynchronous messaging service 116 in the manner previously described. Finally, the asynchronous messaging service 116 delivers the response message to the API 188 via the synchronous messaging service 130.

Referring next to FIGS. 2a through 2f, the data files 200 through 210 will now be described in greater detail. FIG. 2a is a graphical representation of the data file 200. The data file 200 maintains load balancing and failover information for application A for periodic access by the asynchronous messaging service 116. As may now be seen, load balancing is maintained between the plural servers on which instances of an application reside using a time-distribution technique employing one or more message distribution rules and one or more failover rules to rotate request messages to be delivered to distributed applications within the distributed processing environment 100. More specifically, and as will be more fully described below, a respective value of time is associated with each request message to be transferred to an application distributed amongst plural ones of the mid-range servers 104 through 114. The value of time to be associated with a request message is represented as being comprised of two units—a first, or minutes, unit of time and a second, or seconds, unit of time. For example, 1:15 (or one minute and fifteen seconds) is a suitable representation of a value of time to be associated with a request message to be transferred to an application distributed amongst plural ones of the mid-range servers 104 through 114.

As is well known in the art, the range of values for certain units of time may be represented as a self-repeating sequence. For example, for the following sequence of values for a period of elapsed time: "10 seconds, 70 seconds, 130 seconds and 190 seconds", each subsequent value in the sequence has been incremented relative to the preceding value thereof. However, the same sequence of values for a period of elapsed time may also be properly represented as the following sequence: 0:10 (or zero minutes and ten seconds), 1:10 (or one minute and ten seconds), 2:10 (or two minutes and ten seconds) and 3:10 (or three minutes and ten seconds). In this sequence, each value for the first (or minutes) unit of time has been incremented relative to the preceding value thereof. However, the value for the second (or seconds) unit of time remains constant. This value can remain constant because the second unit of time can be viewed of a self-repeating sequence which, starting from zero, is incremented to the value 60 and then re-set to zero.

As illustrated in FIG. 2a, the message distribution rules for request messages to be transferred to distributed application A are: (a) the mid-range server 104 shall receive all request messages received, by the asynchronous messaging service 116, within a first time span which encompasses a contiguous range of values which extends from zero to 20 seconds after each minute; (b) the mid-range server 112 shall receive all request messages received, by the asynchronous messaging service 116, within a second time span which encompasses a contiguous range of values which extends from 21 to 40 seconds after each minute; and (c) the mid-range server 114 shall receive all request messages received, by the asynchronous messaging service 116, within a third time span which encompasses a contiguous range of values which extends from 41 and 60 seconds after each minute. Upon receipt of a request message from the API 188 which is to be processed by the distributed application A, the asynchronous messaging service 116 first checks the time at which the request message was received. The asynchronous messaging service 116 then reviews the data file 200 associated with the distributed application A to determine which one of the mid-range servers 104, 112 and 114 on which instances of the distributed application A reside should received the request message. To select one of the mid-range servers 104, 112 and 114, the asynchronous messaging service 116 compares the seconds unit of the time of receipt of the message to the time spans respectively assigned to each one of the mid-range servers 104, 112 and 114. Upon determining which of the mid-range servers 104, 112 and 114 is assigned to the matching time span, the asynchronous messaging service 116 will initiate the transfer of the request message to the selected mid-range server. Thusly, the asynchronous messaging service 116 rotates the instances of the distributed application to receive a series of request messages based upon the time at which the asynchronous messaging service 116 received each of the request messages.

As will be more fully described below with respect to FIGS. 3a–b, periodically, the asynchronous messaging service 116 will be advised of a failure of an instance of an application. More specifically, upon placing the request message onto a channel for transfer to the client process, for example, the application instance 152 residing on the mid-range server 104, the asynchronous messaging service 116 will initiate a countdown process. If a reply from the client process is not received by the asynchronous messaging service 116 within a pre-selected time period, for example, 5 seconds, the client process and/or the server on which it resides, is determined to have failed. The asynchronous messaging service 116 will then update the data files to reflect the failed client process. Similarly, the asynchronous messaging service 116 will also be periodically advised of the re-registration of one or more of the mid-range servers 104 through 114. When a mid-range server re-registers, the asynchronous messaging service 116 will update the data files 200 through 210 to reflect that the re-registering server is again up and running. Recalling that each mid-range server has plural application instances residing thereat and that the failure of an application instance is treated solely as a failure of only that particular instance and not all instances, the asynchronous messaging service 116 will typically need to check all of the plural data files corresponding to applications residing in the re-registering mid-range server, in the disclosed example, three of the data files 200 through 210, and update only those of the data files which indicate that the re-registering server had failed. Those data files still indicating the re-registering server is running would be left unchanged.

The particular application instances and/or servers determined to have failed based upon the failure of a reply message to be received by the asynchronous messaging service 116 may be varied. For example, in the embodiment of the invention disclosed herein, (a) the failure of a COD message and a subsequent response message to arrive; (b) the failure of a response message without a preceding COD message to arrive; and (c) the successful arrival of a COD message but failure of a subsequent response message to arrive; are all deemed as indicating that a particular instance of an application residing on a particular server has failed. Of course, in the embodiment of the invention disclosed herein, within a single data file, the failure of an instance of an application residing on a particular server is marked as the failure of the server itself since no more than one instance of an application resides on any one server. It should be clearly understood that, in alternate embodiments of the invention, the aforementioned types of message may be deemed to indicate other types of failures within the distributed processing environment 100. For example, the failure of both the COD and response messages to arrive may be deemed as indicating a complete failure of the server for which the instances of all of the applications residing on that server should be marked as having failed. Thus, whereas, in the disclosed embodiment of the invention, data file 200 would be updated to reflect that the mid-range server 104 has failed, in the alternate embodiment of the invention, the data files 200, 202 and 204 would all be updated to reflect that the mid-range server 104 has failed.

Once the asynchronous messaging service 116 has detected the failure of one of the application instances 152 through 186, the asynchronous messaging service 116 updates the appropriate one of the data files 200 through 210 to reflect the detected failure. In the example described herein, the asynchronous messaging service 116 has determined that the instance 152 of application A residing at the mid-range server 104 has failed. The asynchronous messaging service 116 will then update the corresponding data file to reflect the failed instance of the application. In the example described herein, the data file 200 will be updated to reflect the failed instance 152 of application A by marking the mid-range server 104 as failed. In a subsequent access of the data file 200 to determine whether a request message should be transferred to the instance 152 of application A residing on the mid-range server 104, the instance 180 of application A residing on the mid-range server 112 or the instance 184 of application A residing on the mid-range server 114, the asynchronous messaging service 116 will initially select the mid-range server for which the value of the seconds unit of the arrival time of the request message falls within the contiguous range of values of the time span assigned to that mid-range server. The asynchronous messaging service 116 will then check to see if the data file 200 further indicates that the selected mid-range server has failed. If the data file 200 indicates that the selected mid-range server has failed, in accordance with a first failover rule, the asynchronous messaging service 116 will select, as a next (or "replacement") mid-range server, the mid-range server corresponding to a subsequent time span within the self-repeating sequence of time spans contained in the data file 200. For example, if the value of the seconds unit of the arrival time of a request message is between zero and twenty seconds and the data file 200 indicates that mid-range server 104 has failed, the asynchronous messaging service 116 will select the mid-range server 112, which, as may be seen in FIG. 2a, is assigned to the time span encompassing the contiguous range of values between twenty and forty seconds.

In accordance with another example of the failover rules governing selection of a subsequent mid-range server, if: (a) the value of the seconds unit of the arrival time of a request message is between zero and twenty seconds and the data file 200 indicates that both the mid-range servers 104 and 112 have failed; or (b) the value of the seconds unit of the arrival time of a request message is between twenty-one and forty seconds and the data file 200 indicates that the mid-range server 112 has failed, the asynchronous messaging service 116 will select the mid-range server 114, which, as may be further seen in FIG. 2a, is assigned to the time span encompassing the contiguous range of values between forty-one and sixty seconds, as the subsequent mid-range server.

In still another example of the failover rules governing selection of a subsequent mid-range server, if: (a) the value of the seconds unit of the arrival time of a request message is between twenty-one and forty seconds and the data file 200 indicates that both the mid-range servers 112 and 114 have failed; or (b) the value of the seconds unit of the arrival time of a request message is between forty-one and sixty seconds and the data file 200 indicates that the mid-range server 114 has failed, the asynchronous messaging service 116 will select the mid-range server 104, which, as may also be seen in FIG. 2a, is assigned to the time span encompassing the contiguous range of values between zero and twenty seconds, as the subsequent mid-range server.

In still yet another example of the failover rules governing selection of a subsequent mid-range server, if the value of the seconds unit of the arrival time of a request message is between forty-one and sixty seconds and the data file 200 indicates that the mid-range servers 114 and 104 have failed, the asynchronous messaging service will select the mid-range sever 112, which, as may also be seen in FIG. 2a, is assigned to the time span encompassing the contiguous range of values between twenty-one and forty seconds, as the subsequent mid-range server. A final failover rule governing selection of a subsequent mid-range server is that, if the value of the seconds unit of the arrival time of a request message is between (a) zero and twenty seconds; (b) twenty-one and forty seconds; or (c) forty-one and sixty seconds; and the data file 200 indicates that the mid-range servers 104, 112 and 114 have all failed, a subsequent mid-range server will not be selected.

It should be further appreciated that initial selection of a mid-range server to receive the request message and, when appropriate, subsequent determination of server failure and selection of an alternate mid-range server to receive the request message may be executed as a series of steps as disclosed herein with respect to FIGS. 3a–b, below, or, in the alternative, may be executed generally simultaneously as part of a fully integrated load balancing and failover algorithm.

Figure 2B:
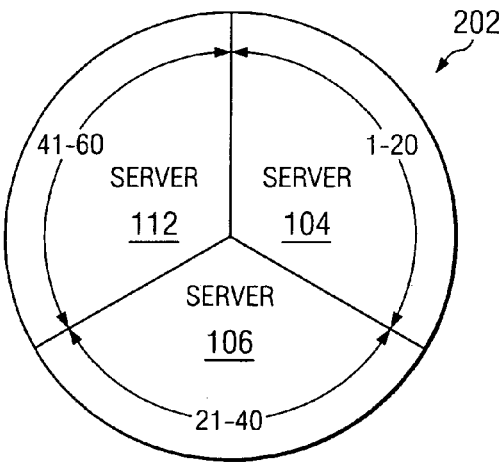
FIG. 2b is a graphical representation of a second data file of the distributed processing environment of FIG. 1.

FIG. 2*b* is a graphical representation of the data file 202. As may now be seen, the data file 202 maintains load balancing and failover information for Application B for periodic access by the asynchronous messaging service 116. As before, load balancing is maintained between the plural servers on which instances of an application reside using a time-distribution technique employing one or more message distribution rules and one or more failover rules. As illustrated in FIG. 2*b*, the message distribution rules for request messages to be transferred to distributed application B are: (a) the mid-range server 104 shall receive all request messages received, by the asynchronous messaging service 116, within a first time span which encompasses a contiguous range of values which extends from zero to 20 seconds after each minute; (b) the mid-range server 106 shall receive all request messages received, by the asynchronous messaging service 116, within a second time span which encompasses a contiguous range of values which extends from 21 to 40 seconds after each minute; and (c) the mid-range server 112 shall receive all request messages received, by the asynchronous messaging service 116, between 41 and 60 seconds after each minute.

In the event that the one or more of the mid-range servers 104, 106 and/or 112 is determined, by the asynchronous messaging service 116, to have failed, the failover rules governing distributed application A similarly govern distributed application B. In other words, upon determining that the selected mid-range server has failed, the asynchronous messaging service 116 shall select, as a next (or "replacement") mid-range server, the mid-range server corresponding to a subsequent time span within the self-repeating sequence of time spans contained in the data file 202. If the next mid-range server selected by the asynchronous messaging service 116 is also determined to have failed, the asynchronous messaging service 116 will then select the mid-range server corresponding to a time span within the self-repeating sequence of time spans contained in the data file 202 which is subsequent to the subsequent time span. This continues until either the selected mid-range server is determined as not having failed or until all of the mid-range servers identified in the data file 202 are determined to have failed.

Thus, if the mid-range server 104 has failed, the asynchronous messaging service 116 will select the mid-range server 106 to receive all request messages received up to 40 seconds after each minute and select the mid-range server 112 to receive all request messages received between 41 and 60 seconds after each minute. Conversely, if the mid-range server 106 has failed, the asynchronous messaging application will select the mid-range server 104 to receive all request messages received up to 20 seconds after each minute and select the mid-range server 112 to receive all request messages received between 21 and 60 seconds after each minute. If the mid-range server 112 has failed, the asynchronous messaging application 116 will select the mid-range server 104 to receive all request messages received up to 20 seconds after each minute, select the mid-range server 106 to receive all request messages received between 21 and 40 seconds after each minute and select the mid-range server 104 to receive all request messages received between 41 and 60 seconds after each minute. If both the mid-range servers 104 and 106 have failed, the asynchronous messaging application 116 will select the mid-range server 112 to receive all request messages received between zero and 60 seconds after each minute. If both the mid-range servers 104 and 112 have failed, the asynchronous messaging application 116 will select the mid-range server 106 to receive all request messages received between zero and sixty seconds after each minute. If both the mid-range servers 106 and 112 have failed, the asynchronous messaging application 116 will select the mid-range server 104 to receive all request messages received between zero and sixty seconds after each minute.

Figure 2C:
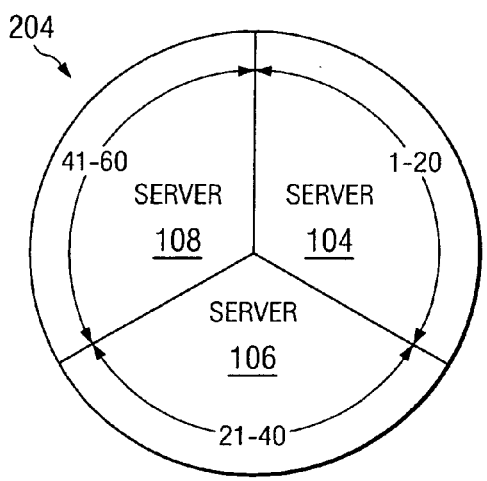
FIG. 2c is a graphical representation of a third data file of the distributed processing environment of FIG. 1.

FIG. 2*c* is a graphical representation of the data file 204. As may now be seen, the data file 204 maintains load balancing and failover information for Application C for periodic access by the asynchronous messaging service 116. As before, load balancing is maintained between the plural servers on which instances of an application reside using a time-distribution technique employing one or more message distribution rules and one or more failover rules. As illustrated in FIG. 2*c*, the message distribution rules for request messages to be transferred to distributed application C are: (a) the mid-range server 104 shall receive all request messages received, by the asynchronous messaging service 116, within a first time span which encompasses a contiguous range of values which extends from zero to 20 seconds after each minute; (b) the mid-range server 106 shall receive all request messages received, by the asynchronous messaging service 116, within a second time span which encompasses a contiguous range of values which extends from 21 to 40 seconds after each minute; and (c) the mid-range server 108 shall receive all request messages received, by the asynchronous messaging service 116, between 41 and 60 seconds after each minute.

In the event that the one or more of the mid-range servers 104, 106 and/or 108 is determined, by the asynchronous messaging service 116, to have failed, the failover rules governing distributed applications A and B similarly govern distributed application C. In other words, upon determining that the selected mid-range server has failed, the asynchronous messaging service 116 shall select, as a next (or "replacement") mid-range server, the mid-range server corresponding to a subsequent time span within the self-repeating sequence of time spans contained in the data file 204. If the next mid-range server selected by the asynchronous messaging service 116 is also determined to have failed, the asynchronous messaging service 116 will then select the mid-range server corresponding to a time span within the self-repeating sequence of time spans contained in the data file 204 which is subsequent to the subsequent time span. This continues until either the selected mid-range server is determined as not having failed or until all of the mid-range servers identified in the data file 204 are determined to have failed.

Thus, if the mid-range server 104 has failed, the asynchronous messaging service 116 will select the mid-range server 106 to receive all request messages received up to 40 seconds after each minute and select the mid-range server 108 to receive all request messages received between 41 and 60 seconds after each minute. Conversely, if the mid-range server 106 has failed, the asynchronous messaging application will select the mid-range server 104 to receive all request messages received up to 20 seconds after each minute and select the mid-range server 108 to receive all request messages received between 21 and 60 seconds after each minute. If the mid-range server 108 has failed, the asynchronous messaging application 116 will select the mid-range server 104 to receive all request messages received up to 20 seconds after each minute, select the mid-range server 106 to receive all request messages received between 21 and 40 seconds after each minute and select the mid-range server 104 to receive all request messages received between 41 and 60 seconds after each minute.

If both the mid-range servers 104 and 106 have failed, the asynchronous messaging application 116 will select the mid-range server 108 to receive all request messages received between zero and 60 seconds after each minute. If both the mid-range servers 104 and 108 have failed, the asynchronous messaging application 116 will select the mid-range server 106 to receive all request messages received between zero and sixty seconds after each minute. If both the mid-range servers 106 and 108 have failed, the asynchronous messaging application 116 will select the mid-range server 104 to receive all request messages received between zero and sixty seconds after each minute.

Figure 2D:
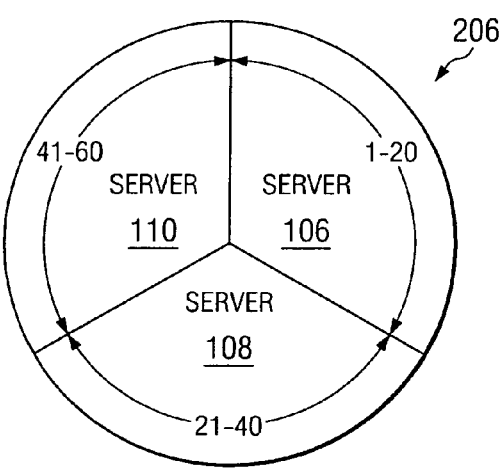
FIG. 2d is a graphical representation of a fourth data file of the distributed processing environment of FIG. 1.

FIG. 2d is a graphical representation of the data file 206. As may now be seen, the data file 206 maintains load balancing and failover information for Application D for periodic access by the asynchronous messaging service 116. As before, load balancing is maintained between the plural servers on which instances of an application reside using a time-distribution technique employing one or more message distribution rules and one or more failover rules. As illustrated in FIG. 2d, the message distribution rules for request messages to be transferred to distributed application D are: (a) the mid-range server 106 shall receive all request messages received, by the asynchronous messaging service 116, within a first time span which encompasses a contiguous range of values which extends from zero to 20 seconds after each minute; (b) the mid-range server 108 shall receive all request messages received, by the asynchronous messaging service 116, within a second time span which encompasses a contiguous range of values which extends from 21 to 40 seconds after each minute; and (c) the mid-range server 110 shall receive all request messages received, by the asynchronous messaging service 116, between 41 and 60 seconds after each minute.

In the event that the one or more of the mid-range servers 106, 108 and/or 110 is determined, by the asynchronous messaging service 116, to have failed, the failover rules governing distributed applications A through C similarly govern distributed application D. In other words, upon determining that the selected mid-range server has failed, the asynchronous messaging service 116 shall select, as a next (or "replacement") mid-range server, the mid-range server corresponding to a subsequent time span within the self-repeating sequence of time spans contained in the data file 206. If the next mid-range server selected by the asynchronous messaging service 116 is also determined to have failed, the asynchronous messaging service 116 will then select the mid-range server corresponding to a time span within the self-repeating sequence of time spans contained in the data file 206 which is subsequent to the subsequent time span. This continues until either the selected mid-range server is determined as not having failed or until all of the mid-range servers identified in the data file 206 are determined to have failed.

Thus, if the mid-range server 106 has failed, the asynchronous messaging service 116 will select the mid-range server 108 to receive all request messages received up to 40 seconds after each minute and select the mid-range server 110 to receive all request messages received between 41 and 60 seconds after each minute. Conversely, if the mid-range server 108 has failed, the asynchronous messaging application will select the mid-range server 106 to receive all request messages received up to 20 seconds after each minute and select the mid-range server 110 to receive all request messages received between 21 and 60 seconds after each minute. If the mid-range server 110 has failed, the asynchronous messaging application 116 will select the mid-range server 106 to receive all request messages received up to 20 seconds after each minute, select the mid-range server 108 to receive all request messages received between 21 and 40 seconds after each minute and select the mid-range server 106 to receive all request messages received between 41 and 60 seconds after each minute. If both the mid-range servers 106 and 108 have failed, the asynchronous messaging application 116 will select the mid-range server 110 to receive all request messages received between zero and 60 seconds after each minute. If both the mid-range servers 106 and 110 have failed, the asynchronous messaging application 116 will select the mid-range server 108 to receive all request messages received between zero and sixty seconds after each minute. If both the mid-range servers 108 and 110 have failed, the asynchronous messaging application 116 will select the mid-range server 106 to receive all request messages received between zero and sixty seconds after each minute.

Figure 2E:
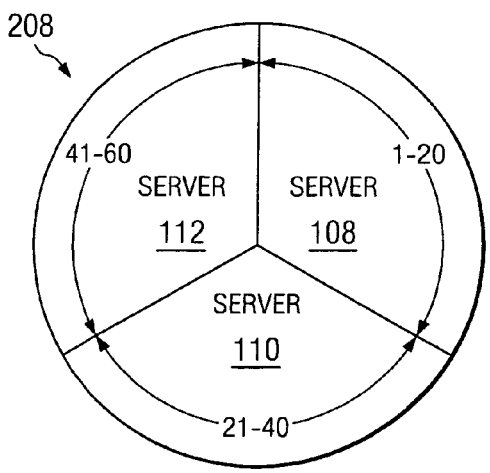
FIG. 2e is a graphical representation of a fifth data file of the distributed processing environment of FIG. 1.

FIG. 2e is a graphical representation of the data file 208. As may now be seen, the data file 208 maintains load balancing and failover information for Application E for periodic access by the asynchronous messaging service 116. As before, load balancing is maintained between the plural servers on which instances of an application reside using a time-distribution technique employing one or more message distribution rules and one or more failover rules. As illustrated in FIG. 2e, the message distribution rules for request messages to be transferred to distributed application E are: (a) the mid-range server 108 shall receive all request messages received, by the asynchronous messaging service 116, within a first time span which encompasses a contiguous range of values which extends from zero to 20 seconds after each minute; (b) the mid-range server 110 shall receive all request messages received, by the asynchronous messaging service 116, within a second time span which encompasses a contiguous range of values which extends from 21 to 40 seconds after each minute; and (c) the mid-range server 112 shall receive all request messages received, by the asynchronous messaging service 116, between 41 and 60 seconds after each minute.

In the event that the one or more of the mid-range servers 108, 110 and/or 112 is determined, by the asynchronous messaging service 116, to have failed, the failover rules governing distributed applications A through D similarly govern distributed application E. In other words, upon determining that the selected mid-range server has failed, the asynchronous messaging service 116 shall select, as a next (or "replacement") mid-range server, the mid-range server corresponding to a subsequent time span within the self-repeating sequence of time spans contained in the data file 208. If the next mid-range server selected by the asynchronous messaging service 116 is also determined to have failed, the asynchronous messaging service 116 will then select the mid-range server corresponding to a time span within the self-repeating sequence of time spans contained in the data file 208 which is subsequent to the subsequent time span. This continues until either the selected mid-range server is determined as not having failed or until all of the mid-range servers identified in the data file 208 are determined to have failed.

Thus, if the mid-range server 108 has failed, the asynchronous messaging service 116 will select the mid-range server 110 to receive all request messages received up to 40 seconds after each minute and select the mid-range server 112 to receive all request messages received between 41 and 60 seconds after each minute. Conversely, if the mid-range server 110 has failed, the asynchronous messaging application will select the mid-range server 108 to receive all request messages received up to 20 seconds after each minute and select the mid-range server 112 to receive all request messages received between 21 and 60 seconds after each minute. If the mid-range server 112 has failed, the asynchronous messaging application 116 will select the mid-range server 108 to receive all request messages received up to 20 seconds after each minute, select the mid-range server 110 to receive all request messages received between 21 and 40 seconds after each minute and select the mid-range server 108 to receive all request messages received between 41 and 60 seconds after each minute. If both the mid-range servers 108 and 110 have failed, the asynchronous messaging application 116 will select the mid-range server 112 to receive all request messages received between zero and 60 seconds after each minute. If both the mid-range servers 108 and 112 have failed, the asynchronous messaging application 116 will select the mid-range server 110 to receive all request messages received between zero and sixty seconds after each minute. If both the mid-range servers 110 and 112 have failed, the asynchronous messaging application 116 will select the mid-range server 108 to receive all request messages received between zero and sixty seconds after each minute.

Figure 2F:
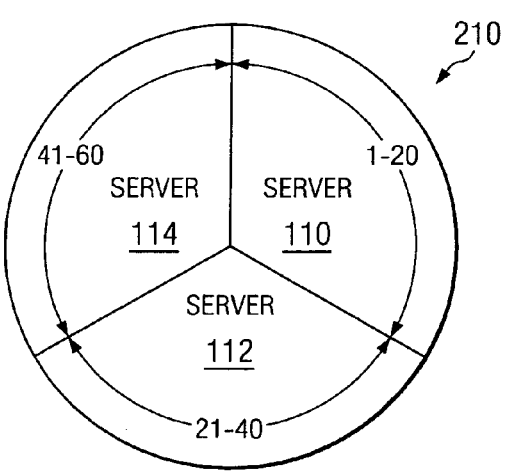
FIG. 2f is a graphical representation of a sixth data file of the distributed processing environment of FIG. 1.

FIG. 2f is a graphical representation of the data file 210. As may now be seen, the data file 210 maintains load balancing and failover information for Application F for periodic access by the asynchronous messaging service 116. As before, load balancing is maintained between the plural servers on which instances of an application reside using a time-distribution technique employing one or more message distribution rules and one or more failover rules. As illustrated in FIG. 2f, the message distribution rules for request messages to be transferred to distributed application F are: (a) the mid-range server 110 shall receive au request messages received, by the asynchronous messaging service 116, within a first time span which encompasses a contiguous range of values which extends from zero to 20 seconds after each minute; (b) the mid-range server 112 shall receive all request messages received by the asynchronous messaging service 116, within a second time span which encompasses a contiguous range of values which extends from 21 to 40 seconds after each minute; and (c) the mid-range server 114 shall receive all request messages received, by the asynchronous messaging service 116, between 41 and 60 seconds after each minute.

In the event that the one or more of the mid-range servers 110, 112 and/or 114 is determined, by the asynchronous messaging service 116, to have failed, the failover rules governing distributed applications A through E similarly govern distributed application F. In other words, upon determining that the selected mid-range server has failed, the asynchronous messaging service 116 shall select, as a next (or "replacement") mid-range server, the mid-range server corresponding to a subsequent time span within the self-repeating sequence of time spans contained in the data file 210. If the next mid-range server selected by the asynchronous messaging service 116 is also determined to have failed, the asynchronous messaging service 116 will then select the mid-range server corresponding to a time span within the self-repeating sequence of time spans contained in the data file 210 which is subsequent to the subsequent time span. This continues until either the selected mid-range server is determined as not having failed or until all of the mid-range servers identified in the data file 210 are determined to have failed.

Thus, if the mid-range server 110 has failed, the asynchronous messaging service 116 will select the mid-range server 112 to receive all request messages received up to 40 seconds after each minute and select the mid-range server 114 to receive all request messages received between 41 and 60 seconds after each minute. Conversely, if the mid-range server 112 has failed, the asynchronous messaging application will select the mid-range server 110 to receive all request messages received up to 20 seconds after each minute and select the mid-range server 114 to receive all request messages received between 21 and 60 seconds after each minute. If the mid-range server 114 has failed, the asynchronous messaging application 116 will select the mid-range server 10 to receive all request messages received up to 20 seconds after each minute, select the mid-range server 112 to receive all request messages received between 21 and 40 seconds after each minute and select the mid-range server 110 to receive all request messages received between 41 and 60 seconds after each minute. If both the mid-range servers 110 and 112 have failed, the asynchronous messaging application 116 will select the mid-range server 114 to receive all request messages received between zero and 60 seconds after each minute. If both the mid-range servers 110 and 114 have failed, the asynchronous messaging application 116 will select the mid-range server 112 to receive all request messages received between zero and sixty seconds after each minute. If both the mid-range servers 112 and 114 have failed, the asynchronous messaging application 116 will select the mid-range server 110 to receive all request messages received between zero and sixty seconds after each minute.

Figure 3A:
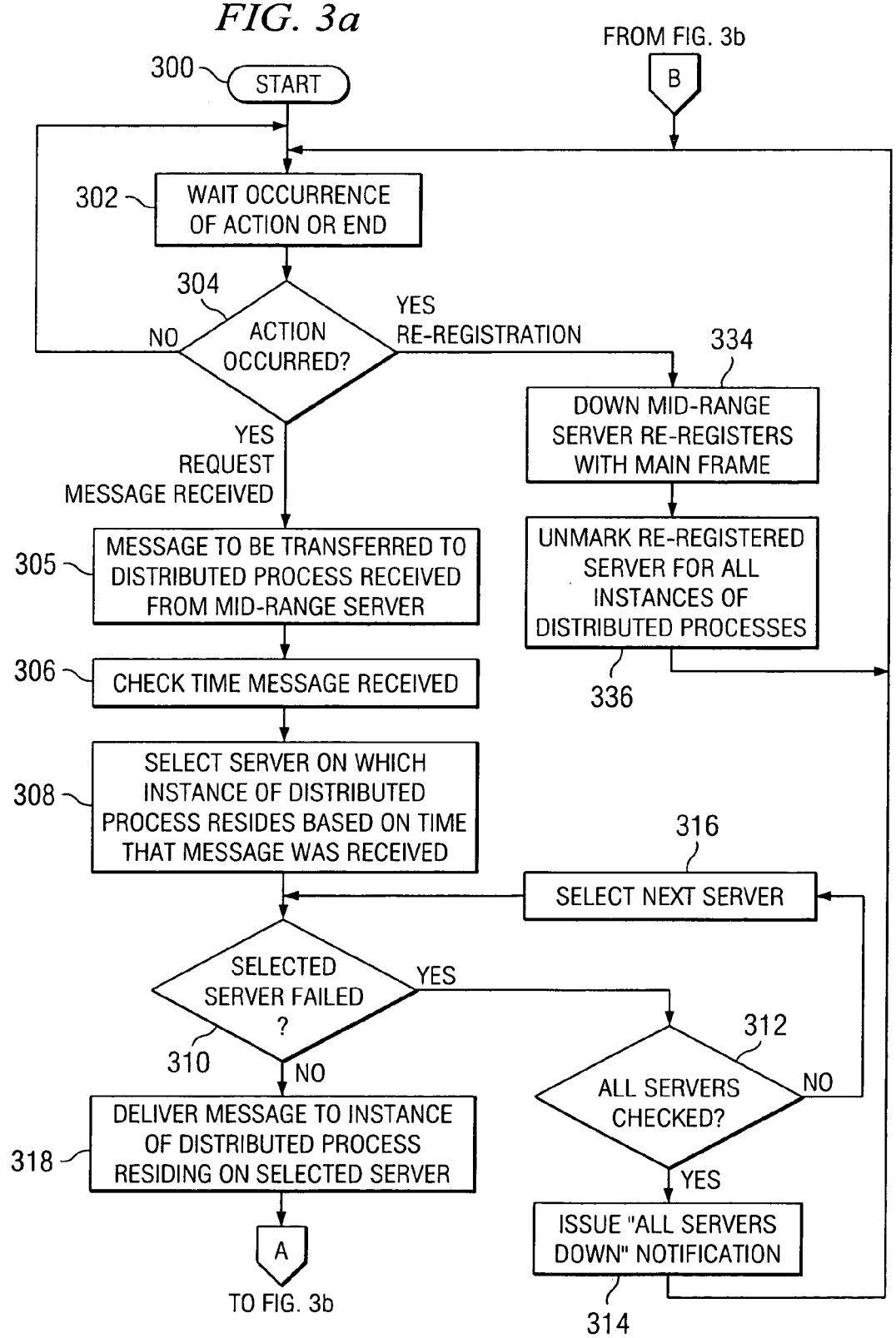

Referring next to FIGS. 3a–b, a method of delivering messages to instances of applications in a distributed processing environment, for example, the computer network 100, in a manner which takes load balancing and failover considerations into account will now be described in greater detail. The method commences at step 300. At step 300, it is presumed that all of the mid-range servers 104 through 114 have registered with the asynchronous messaging service 116. The asynchronous messaging service 116 checks the data files 200 through 210 to ensure that the data files 200 through 210 indicate that all of the mid-range servers 104 through 114 are good. Once the initial start-up process is complete, the method proceeds to step 302 to await the occurrence of an action or an end to the method. Proceeding on to step 304, in response to the occurrence of an action, the method will execute one or more steps as hereinbelow set forth. Absent the occurrence of an action at step 304, however, the method will not execute any steps and will instead return to step 302 to await occurrence of an action or an end to the method.

Returning to step 304, if the action which has occurred is that the asynchronous messaging service 116 has received a request message, the method proceeds to step 305 where the asynchronous messaging service receives a request message to be delivered to an application distributed amongst the mid-range servers 104 through 114 of the distributed processing environment 100 for execution or other processing. The method then continues on to step 306 where the process by which load balancing and failover considerations are taken into account when selecting an instance of a distributed application to receive the request message is initiated. At step 306, the asynchronous messaging service 116 checks the time at which the message was received thereby, for example, by checking a time stamp field of the received message. After determining the time at which the message was received, the method proceeds to step 308 for selection of a mid-range server by the asynchronous messaging service 116. To do so, the asynchronous messaging service 116 reviews the contents of the data file corresponding to the distributed application to receive the request message. For example, if the request message is to be delivered to application A, the asynchronous messaging service 116 would review the contents of the data file 200 and select one of the mid-range servers listed therein based upon the value of the seconds unit of the arrival time of the request message. For example, if the value of the seconds unit of the arrival time for the request message was 45 seconds, the asynchronous messaging service 116 would select the instance of application A residing on the mid-range server 114 to receive the request message.

Continuing on to step 310, the asynchronous messaging service 116 then checks to determine if the selected server, here, the mid-range server 114, has failed. To do so, the asynchronous messaging service 116 again checks the data file 200, this time to see if the data file 200 further indicates that the selected server, here, the mid-range server 114, has failed. If the data file 200 indicates that the selected server has failed, the method proceeds to step 312 where, if all of the servers on which an instance of application A resides have been checked and determined to have failed, the method proceeds to step 314 where an "all servers down" notification is issued to the application or API which initially generated the request message. The method then returns to step 302 to again await the occurrence of an action or an end to the method.

Returning to step 312, if all of the servers have not been checked to determine if they have failed, the method instead proceeds to step 316 where the asynchronous messaging service 116 again accesses the data file 200 and selects a next (or "replacement") server in accordance with the message distribution and failover rules previously set forth. For example, if the value of the seconds unit of the arrival time of the request message at the asynchronous messaging service 116 was 45 seconds and the mid-range server 114 has failed, the mid-range server 104 is selected as the replacement server since the mid-range server 104 corresponds to the time span subsequent to the time span within which the value of the seconds unit of the arrival time of the request message fell. Upon selection of the replacement server at step 316, the method then returns to step 310 where it is again determined whether the selected server (now, the mid-range server 104) has failed.

Returning to step 310, if it is determined at step 310 that the selected server has not failed, the method proceeds to step 318 for delivery of the request message to the instance of the distributed application residing on the selected server. In the example described herein, the request message would be delivered to the instance 152 of application A residing on the mid-range server 104. As previously described with respect to FIG. 1, the delivery of the request message typically results in the return of two reply messages to the asynchronous messaging service 116. The first reply message is the COD message which is transmitted to the asynchronous messaging service 116 when the synchronous messaging service 132 takes the request message off of the queue within the asynchronous messaging service 118. The second reply message is a response generated by the instance 152 of application A to the request message. Typically, the COD message would be the first reply message expected while the response message would be the second reply message expected. However, under certain circumstances, the response message may occasionally arrive at the asynchronous messaging service 116 before the COD message.

Continuing on to step 320, a countdown of a pre-selected time period, for example, five seconds, is initiated. If no reply message of any type is received within the pre-selected time period, it is determined that a failure has occurred. In the embodiment of the invention disclosed herein, the method determines that the mid-range server on which the instance of the distributed application selected to receive the request message has failed. Thus, in the foregoing example, it would be determined that the mid-range server 104 on which the instance 152 of the application A has failed. The method would then proceed to step 322 where the data file 200 is updated to reflect that the mid-range server 104 has failed and on to step 324 where a "selected server down" notification would be issued to the application or API which originated the request message. The method would then return to step 302 to await occurrence of a next action or an end to the method.

Returning to step 320, if a reply message is received within the pre-selected time period, the method proceeds to step 326 where it is determined if the reply message is a response to the request message. If it is, the asynchronous messaging service 116 determines that the request message was properly processed. Accordingly, updating of the data file is not required and the method returns to step 302 to await occurrence of a next action or an end to the method. If, however, the reply message is not a response, the method proceeds to step 328 where the asynchronous messaging service 116 determines if the reply message is a COD. If the reply message is not a COD, then the reply message is neither a response nor a COD. Accordingly, the method will return to step 320 to await a return message which is either a response or a COD. It should be noted, however, that the previously initiated countdown of the pre-selected time period continues.

Returning to step 328, if the reply message is a COD, the method proceeds to step 330 to await receipt of another reply message within the previously initiated countdown of the pre-selected time period. If the previously initiated countdown of the pre-selected time period expires without receipt of another reply message, the asynchronous messaging service again determines that a failure has occurred. As before, in the embodiment of the invention disclosed herein, the method determines that the mid-range server on which the instance of the distributed application selected to receive the request message has failed. Thus, in the foregoing example, it would again be determined that the mid-range server 104 on which the instance 152 of the application A has failed. The method would then proceed to step 322 where the data file 200 is updated to reflect that the mid-range server 104 has failed, to step 324 where a "selected server down" notification would be issued to the application or API which originated the request message and on to step 302 to await occurrence of a next action or an end to the method.

If, however, it is determined at step 330 that a reply message is received by the asynchronous messaging service 116 before the countdown is concluded, the method proceeds to step 332 where the asynchronous messaging service 116 determines if the received reply message is a response to the request message. If the received reply is not a response, the countdown continues and the method returns to step 330 to await receipt of a reply message before the countdown is concluded. If, however, the received reply is a response to the request message, the asynchronous messaging service 116 determines that the request message was properly processed. Accordingly, updating of the data file is not required and the method returns to step 302 to await occurrence of a next action or an end to the method.

Returning to step 304, if the action which has occurred is that a re-registration of a failed mid-range server has occurred, the method proceeds to step 334 where a failed mid-range server, for example, the mid-range server 104, re-registers with the mainframe 102. The method then proceeds to step 336 where the asynchronous messaging service 116 removes, from the data files 200 through 210, all indications that the re-registering server has failed. For example, the mid-range server 104 has the instance 152 of application A, the instance 154 of application B and the instance 156 of application C residing thereon. Upon re-registration of the mid-range server 200, the asynchronous messaging service 116 would need to check all of the data files 200 through 208 which maintain information related to the mid-range server 104. Thus, the asynchronous messaging service 116 would check the data files 200, 202 and 204 to see if any of the aforementioned data files indicate that the mid-range server 104 had failed. All of the data files 200, 202 and 204 which indicate that the mid-range server 104 would be updated to remove any indication of server failure. The method would then return to step 302 to await occurrence of a next action or an end to the method. Accordingly, upon returning once again to step 302, if there are no further occurrences of aforedescribed actions, the method of the present invention ends.

Thus, there has been described and illustrated herein, a distributed processing environment which includes a rotating message delivery system suitable for use in load balancing and/or messaging failover among plural computer platforms thereof. By rotating messaging services among the plural computer platforms in a manner that takes both load balancing and messaging failover into account, operation of the distributed processing environment can be enhanced. Those skilled in the art should recognize that numerous modifications and variations may be made in the techniques disclosed herein without departing substantially from the spirit and scope of the invention. Accordingly, the scope of the invention should only be defined by the claims appended hereto.

The invention claimed is:

1. A distributed processing system, comprising:
   a client computer platform;
   a plurality of server computer platforms, each one of said plurality of server computer platforms having an instance of an application residing thereon;
   a messaging system for controlling the exchange of messages between said client computer platform and said plurality of server computer platforms, said messaging system including messaging services residing at said client computer platform and each one of said plurality of server computer platforms; and
   a time-distributed load balancing system residing at said client computer platform, said time-distributed load balancing system determining, for a message to be transferred to said application by said messaging system, which one of said plurality of server computer platforms is to receive said message based upon a time associated with said message and at least one message distribution rule requiring transfer of said message to a selected one of said plurality of server computer platforms if said time associated with said message falls within a corresponding one of a plurality of pre-determined time spans;
   said time associated with said message includes a value for a first unit of time and a value for a second unit of time; and
   each one of said plurality of pre-determined time spans encompassing a contiguous range of values for said second unit of time.

2. The distributed processing system of claim 1, wherein said time associated with said message is an arrival time for said message at said messaging service residing at said client computer platform.

3. The distributed processing system of claim 1, wherein:
   using said at least one message distribution rule, said time-distributed load balancing system divides said first unit of time into said plurality of pre-determined time spans and associates each one of said plurality of pre-determined time spans to said corresponding one of said plurality of server computer platforms; and
   said time-distributed load balancing system determining which of said plurality of server computer platforms is to receive said message based upon which, of said plurality of
   pre-determined time spans, said value of said second unit of time associated with said message falls within.

4. The distributed processing system of claim 3, wherein said first unit of time is minutes and said second unit of time is seconds.

5. The distributed processing system of claim 4, wherein said time associated with said message is an arrival time for said message at said messaging service residing at said client computer platform.

6. The distributed processing system of claim 3, wherein said time-distributed load balancing system residing at said client computer platform further comprises:
   a data file for maintaining a list of said plurality of server computer platforms, said pre-determined time span associated with each one of said plurality of server computer platforms and said contiguous range of values for said second unit of time encompassed by said pre-determined time span associated with each one of said plurality of server computer platforms; and
   a software application which implements said at least one message distribution rule by determining which one of said plurality of server computer platforms is to receive said message by comparing said value of said second unit of time associated with said message to said contiguous range of values encompassed by each one of said plurality of pre-determined time spans maintained in said data file.

7. The distributed processing system of claim 6, wherein said software application resides within said messaging service residing at said client computer platform.

8. The distributed processing system of claim 6 wherein:
   said client computer platform is a mainframe computer system;
   each one of said plurality of server computer platforms is a mid-range server computer system; and
   said messaging services residing at said client computer platform and each one of said server computer platforms are asynchronous messaging services which enable the exchange of messages between a mainframe computer systems and a mid-range server computer system.

9. The distributed processing system of claim 8, wherein said first unit of time is one minute and said second unit of time is seconds.

10. The distributed processing system of claim 9, wherein said plurality of pre-determined time spans further comprises:
a first time span which extends between 0 and 20 seconds;
a second time span which extends between 21 and 40 seconds; and
a third time span which extends between 41 and 60 seconds.

11. The distributed processing system of claim 9, wherein said time associated with said message is an arrival time for said message at said message at said messaging service for said client computer platform.

12. The distributed processing system of claim 11, wherein said software application resides within said messaging service residing at said client computer platform.

13. A distributed processing system, comprising:
a client computer platform;
a plurality of server computer platforms, each one of said plurality of server computer platforms having an instance of an application residing thereon;
a messaging system for controlling the exchange of messages between said client computer platform and said plurality of server computer platforms, said messaging system including messaging services residing at said client computer platform and each one of said plurality of server computer platforms;
a time-distributed load balancing and failover system residing at said client computer platform, said time-distributed load balancing and failover system determining, for a message to be transferred to said application by said messaging system, which one of said plurality of server computer platforms is to receive said message based upon a time associated with said message, at least one message distribution rule requiring transfer of said message to a selected one of said plurality of server computer platforms if said time associated with said message falls within a corresponding one of a plurality of pre-determined time spans and at least one failover rule requiring transfer of said message to a subsequent one of said plurality of server computer platforms associated with a subsequent one of said plurality of pre-determined time spans if said selected server computer platform has failed;
said time associated with said message includes a value for a first unit of time and a value for a second unit of time; and
each one of said plurality of pre-determined time spans encompassing a contiguous range of values for said second unit of time.

14. The distributed processing system of claim 13, wherein:
using said at least one message distribution rule, said time-distributed load balancing failover system divides said first unit of time into said plurality of pre-determined time spans, associated each one of said plurality of pre-determined time spans with a corresponding one of said server computer platforms and arranges said plurality of pre-determined time spans into a self-repeating sequence
said time distributed load balancing and failover system determining which of said plurality of server computer platforms is to receive said message based upon which one, of said plurality of pre-determined time spans, said value of said second unit of time associated with said message falls within
using said at least one failover rule, if said server computer platform associated with said pre-determined time span within which said value of said second unit of time associated with said message falls within has failed, said time distributed load balancing and failover system selecting, as said subsequent server computer platform to receive said message, said server computer platform associated with a next pre-determined time span in said self-repeating sequence of said pre-determined time spans.

15. The distributed processing system of claim 14, wherein said first unit of time is one minute and said second unit of time is seconds.

16. The distributed processing system of claim 15, wherein said time associated with said message is the arrival time for said message at said messaging service residing at said client computer platform.

17. The distributed processing system of claim 14, wherein said time-distributed load balancing and failover system residing at said client computer platform further comprises:
a data file for maintaining a list of said plurality of server computer platforms, said predetermined time span associated with each one of said plurality of server computer platforms, said contiguous range of values for said second unit of time encompassed by said pre-determined time span associated with each one of said plurality of server computer platforms and a mark indicating which ones of said plurality of server computer platforms have failed; and
a software application which implements said at least one message distribution rule by determining which one of said plurality of server computer platforms is to receive said message by comparing said value of said second unit of time associated with said message to said contiguous range of values encompassed by each one of said plurality of pre-determined time spans maintained in said data file.

18. The distributed processing system of claim 17, wherein said software application implements said at least one failover rule by determining that, if said server computer platform associated with said pre-determined time span within which said value of said second unit of time associated with said message falls within has failed, said server computer platform associated with said next pre-determined time span in said self-repeating sequence of said pre-determined time spans is to receive said message.

19. The distributed processing system of claim 18, wherein said first unit of time is one minute and said second unit of time is seconds.

20. The distributed processing system of claim 19, wherein said time associated with said message is the arrival time for said message at said messaging service residing at said client computer platform.

21. A distributed processing system, comprising:
a client computer platform;
a plurality of server computer platforms coupled to said client computer platform;
an asynchronous messaging system for controlling the exchange of messages between said client computer platform and said plurality of server computer platforms, said asynchronous messaging system including asynchronous messaging services residing at said client computer platform and each one of said plurality of server computer platforms;
at least two instances of each one of a plurality of applications distributed among said plurality of server computer platforms, said at least two instances of each one of said plurality of applications residing at respective ones of said plurality of server computer platforms;
a plurality of data files residing at said client computer platform, each one of said plurality of data files corresponding to one of said plurality of applications;
each one of said plurality of data files maintaining:
  a lit of each one of said at least two instances of said corresponding one of said plurality of applications and said respective ones of said plurality of server computer platforms on which they reside; and
  a pre-determined time span assigned to each one of said at least two instances of said corresponding one of said plurality of applications and said respective ones of said server computer platforms on which they reside, for each of said respective ones of said plurality of server computer platforms, said pre-determined time spans assigned to said corresponding one of said plurality of applications arranged in a self-repeating sequence, collectively comprise a first unit of tie and respectively encompass a contiguous range of values for a second unit of time; and
a load balancing and failover software application residing at said client computer platform;
for each message to be delivered to a first one of said plurality of applications distributed among said plurality of server computer platforms, said load balancing and failover software application:
  determining an arrival time of said message at said asynchronous messaging service of said client computer platform, said arrival time of said message including a first value for said first unit of time and a second value for said second unit of time; and
  selecting, as said server computer platform to receive said message, said server computer platform corresponding to said pre-determined span of time assigned to said instance of said application for which said second value for said arrival time falls within said contiguous range of values.

22. The distributed processing system of claim 21, wherein:
each one of said data files further maintains an indication as to whether each one of said at least two instances of said corresponding one of said plurality of applications has failed;
for each message to be delivered to said first one of said distributed applications, said load balancing and failover software application:
  determining, from said list, if said selected server computer platform has failed; and
  if said selected server computer platform has failed, selecting, as a substitute server computer platform, said server computer platform associated with a next pre-determined time span in said self-repeating sequence of said pre-determined time spans;
  repeating said determining and selecting actions until said selected computer platform is not determined to have failed or until all of said server computer platforms have been selected and determined to have failed.

23. The distributed processing system of claim 22, wherein, for each re-registration of one of said plurality of server computer platforms with said asynchronous messaging system residing at said client computer platform, said load balancing and failover software application removing said failure indication from each of said listed instances of said plurality of applications residing on said re-registering server computer platform.

24. The distributed processing system of claim 23, and further comprising:
a synchronous messaging service residing on each one of said plurality of server computer platforms, said synchronous messaging service handling the exchange of messages between said asynchronous messaging service residing on said server computer platform and said instances residing on said server computer platform;
said asynchronous messaging service reporting first and second types of responses from said server computer platform selected to receive said message, said first type of message confirming receipt of said message by said messaging service at said selected server and said second type of message confirming receipt of a response to said message;
said load balancing and failover software application:
  determining, upon failing to receive said first type of message within a pre-selected period, that all said instances of said plurality of applications residing at said selected server computer system have failed; and
  determining, upon failing to receive said second type of message within said pre-selected time period, that said selected instance of said application residing at said selected server computer system has failed.

25. The distributed processing system of claim 23, and further comprising:
a synchronous messaging service residing on each one of said plurality of server computer platforms, said synchronous messaging service handling the exchange of messages between said asynchronous messaging service residing on said server computer platform and said instances residing on said server computer platform;
said asynchronous messaging service reporting first and second types of responses from said server computer platform selected to receive said message, said first type of message confirming receipt of said message by said messaging service at said selected server and said second type of message confirming receipt of a response to said message;
said load balancing and failover software application:
  determining, upon failing to receive said first type of message within a pre-selected period, that all said instances of said plurality of applications residing at said selected server computer system have failed; and
  determining, upon failing to receive said second type of message within said pre-selected time period, that said selected instance of said application residing at said selected server computer system have failed.

* * * * *